United States Patent
Gendron

(10) Patent No.: US 7,096,971 B1
(45) Date of Patent: Aug. 29, 2006

(54) BI-DIRECTIONAL DRAG GRADER

(76) Inventor: Robert J. Gendron, 1 Stagecoach Rd., Lebanon, NH (US) 03766

( * ) Notice: Subject to any disclaimer, the term of this patent is extended or adjusted under 35 U.S.C. 154(b) by 127 days.

(21) Appl. No.: 10/883,386

(22) Filed: Jul. 1, 2004

Related U.S. Application Data

(60) Provisional application No. 60/484,296, filed on Jul. 3, 2003.

(51) Int. Cl.
- A01B 15/00 (2006.01)
- A01B 23/00 (2006.01)
- A01B 31/00 (2006.01)
- A01B 35/20 (2006.01)
- A01B 39/20 (2006.01)

(52) U.S. Cl. .................. 172/272; 172/684.5

(58) Field of Classification Search ........... 172/199, 172/197, 189, 272, 274, 612, 744, 734, 684.5, 172/776

See application file for complete search history.

(56) References Cited

U.S. PATENT DOCUMENTS

| | | | | |
|---|---|---|---|---|
| 1,047,061 A * | 12/1912 | Hunter | ............... | 172/684.5 |
| 1,246,649 A * | 11/1917 | Peterson | ............... | 172/684.5 |
| 4,700,786 A * | 10/1987 | Berry | ............... | 172/799.5 |
| 4,850,433 A * | 7/1989 | West | ............... | 172/32 |
| 4,907,357 A * | 3/1990 | Lilienthal | ............... | 37/197 |
| 5,595,007 A * | 1/1997 | Biance | ............... | 37/268 |
| 6,168,348 B1 * | 1/2001 | Meyer et al. | ............... | 404/90 |
| 6,293,351 B1 * | 9/2001 | Schmidt | ............... | 172/439 |
| 6,315,056 B1 * | 11/2001 | Ransom et al. | ............... | 172/684.5 |
| 6,336,281 B1 * | 1/2002 | Fulton, III | ............... | 37/197 |
| 6,648,078 B1 * | 11/2003 | Moffett et al. | ............... | 172/788 |

* cited by examiner

Primary Examiner—Christopher J. Novosad
(74) Attorney, Agent, or Firm—Michael J. Weins; Jeffrey E. Sempreson

(57) ABSTRACT

A bi-directional drag grader comprising a rigid overhead support, attachable to a self propelled machine using a common receiver hitch or directly attached, a substantially rectangular rigid and collapsible frame, the frame having a leading edge and trailing edge with attachable blades, the blades having a planer sections along the length and inclined with respect to each other, the frame and support are operatively attached by forward and rearward chain lengths. Runners with stops are attached across the frame to support and position weights and prevent bending of the blades or frame while encountering loads in use. The frame and blades further comprise a design to use alternate configurations of cutting blades. The grader is configured so that the forward chains are in tension and the rearward chains are relaxed when the vehicle moves forward and vice-versa. This configuration allows for bi-directional operation.

7 Claims, 3 Drawing Sheets

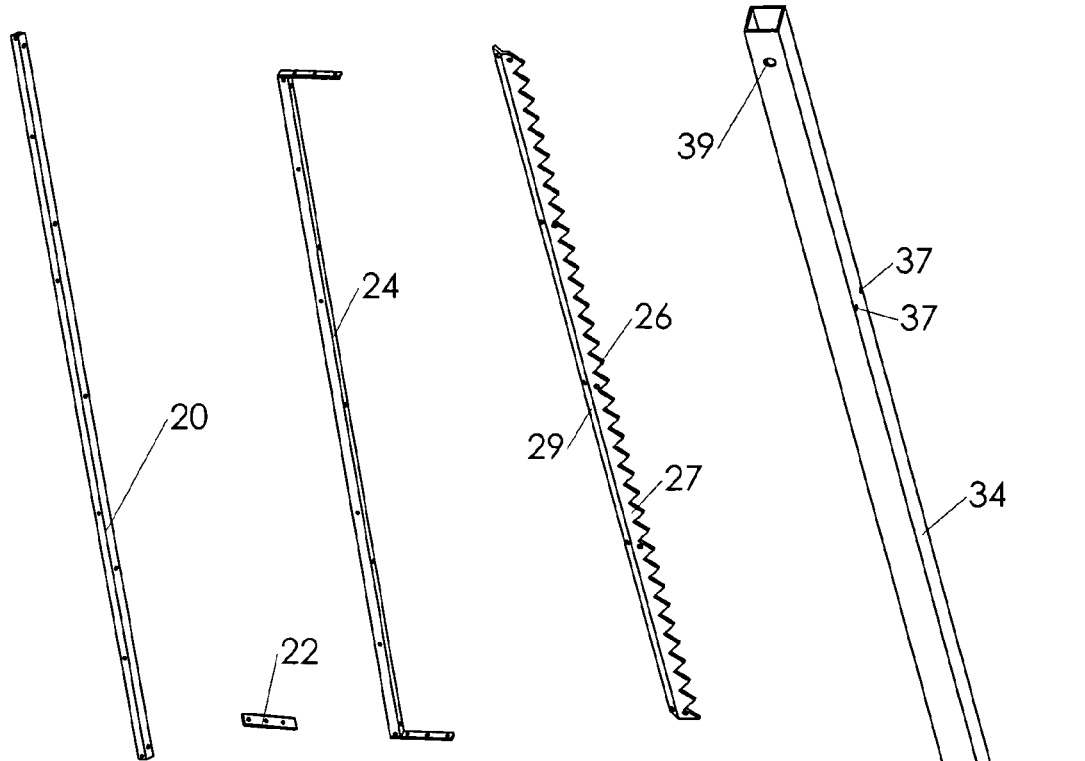
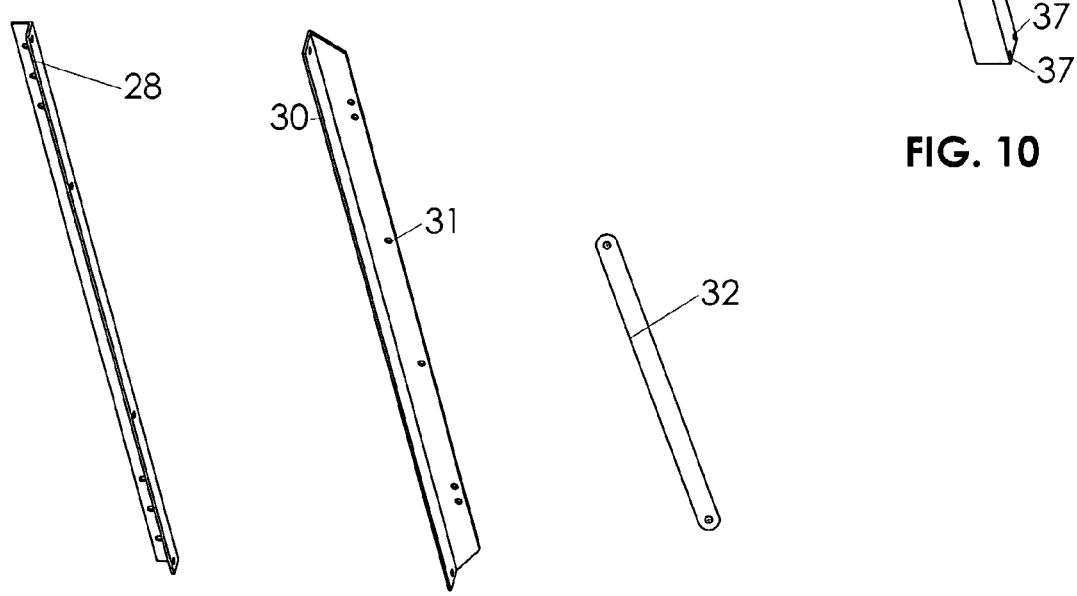
FIG. 3 FIG. 4 FIG. 5 FIG. 6 FIG. 10
FIG. 7 FIG. 8 FIG. 9

BI-DIRECTIONAL DRAG GRADER

This application is claiming the benefit under 35 USC 119(e) parent application 60/484,296 filed Jul. 3, 2003

FIELD OF THE INVENTION

This invention relates to drag graders. A drag grader is an earth-working device attachable to a self propelled machine used to perform such functions as spreading and grading dirt, gravel, or other earthen surfaces.

DESCRIPTION OF PRIOR ART

Drag graders to level earth are common in prior art and have been used for centuries in various forms. All previous drag graders are designed to be operated in a single direction. This is a distinct disadvantage where there is insufficient room for the machine to turn around, such as a narrow road or driveway. Other bi-directional graders found in prior art require a rigid connection to the machine, typically using a 3 point hitch. These graders rely on mechanical force applied to the surface through this rigid connection and thus require very sturdy and expensive machinery to handle the loads encountered during operation. This limits the use of previous bi-directional graders to owners of this specialized equipment.

This invention provides a surface leveling method and apparatus that can be used bi-directionally with any common vehicle capable of attaching a rigid overhead support. Chains attached to the rigid overhead support in both directions overcome the previous limitations of prior bi-directional graders by allowing use with other vehicles such as a passenger car, truck, or any vehicle to which the overhead support can be attached.

U.S. Pat. No. 6,168,348 to Meyer 2001 shows a bi-directional grader but requires a 3 point hitch and cannot be easily attached to standard available equipment. Further, it is far bulkier and not easy to transport by hand, and does not apply weight to control force. The bi-directional feature is accomplished by the design of the supporting structure and not the blade itself. Its complexity, mounting requirements, and methods use to produce bi-directional function are clearly different.

U.S. Pat. No. 4,700,786 to Berry 1987 shows a drag grader which requires hydraulics to change the angle. While it uses plural blades as well, it can only be used in one direction.

U.S. Pat. No. 4,850,433 to West 1989 shows a landscape conditioning assembly that accomplishes angularity of blades to the ground by the frame structure, has no means of use in reverse, and is not supported by an overhead beam. It also has provisions for weight to be added but not as an integral part of the frame or having a means of positioning.

U.S. Pat. No. 1,246,649 to Peterson 1917, U.S. Pat. No. 1,212,134 to Fry 1917, U.S. Pat. No. 1,047,061 to Hunter 1912, and U.S. Pat. No. 6,315,056 to Ranson 2001 all show forms of drag graders using chains. None however are bi-directional and are not designed to be connected via a rigid overhead support.

U.S. Pat. No. 6,293,351 to Schmidt 2001 shows a hitch adapter which utilizes the receiver hitch on a motor vehicle to allow mounting of grading attachments requiring 3 point hitches. This method is obviously significantly different in design. Several other designs using attachments to the rear of vehicles for plowing or grading can be found in U.S. Pat. No. 5,595,007 to Biance 1997, U.S. Pat. No. 6,336,281 to Fulton 2002 and U.S. Pat. No. 4,907,357 to Lilienthal 1990; all of these have a rigid attachment from the vehicle to the grading blade. None are flexibly coupled by chains and are not capable of substantial bi-directional use.

SUMMARY

In accordance with the present invention, a bi-directional drag grader comprising a rigid overhead support, attachable to a self propelled machine, a substantially rectangular rigid and collapsible frame, the frame and support being attached forward and rearward chain lengths, and a means to adjust length of the chain to the rigid overhead support. The frame further comprises a design to support and position weights, and alternate configurations of cutting blades.

OBJECTS AND ADVANTAGES

Accordingly, besides the objects and advantages of the bi-directional grader in my above patent, several objects and advantages of the present invention are:

(a) to provide earth grader capable of bi-directional operation without the need for the frame and cutting blades to be rigidly attached to the tow vehicle;

(b) to provide flexible coupling of the frame to a rigid overhead support;

(c) to provide an earth grader with a free hanging frame system that allows the unit to move when striking a submerged rock or hard object which limits potential damage to the unit itself or the tow vehicle;

(d) to provide a method of blade mounting to the frame which allows either edge of the cutting blade to be in contact with the surface to be worked;

(e) to provide a method of blade mounting to the frame which allows the blades to be combined in multiple configurations;

(f) to provide a method of blade mounting to the frame which allows primary cutting of the surface to be graded to occur in a one-direction or bi-directional mode;

(g) to provide weighting system to the frame that adds vibration to the blades which aids in the digging power for weed removal and better leveling of imperfections in the surface being graded.

(h) to provide a weighting system to the frame that allows varying positions of the weight to control the force applied over the length of the individual blades and/or to each individual blade to the surface being worked;

(i) to provide a rigid overhead support that can be easily connected to any vehicle with a standard square receiver hitch to be used as well as other direct mounting schemes;

(j) to provide an simple method of adjusting the lengths of the connecting chains to the front and rear and both sides of the frame to the rigid overhead support which allows the grader to be easily angled, or one side lifted, which allows material being graded to move in a desired direction; and (k) to provide an integrated system which will work equally well with the vehicle operating in reverse or forward to eliminate the need to turn the vehicle around when grading in tight spots such as a narrow roadway.

Insofar as I am aware, no earth grader apparatus and method formerly developed provides the ability to grade and level earth utilizing an overhead supported, free hanging and integrated weighting system that can be utilized on a common passenger vehicle in both directions. Still further objects and advantages become apparent from a consideration of the ensuing description and drawings.

BRIEF DESCRIPTION OF THE DRAWING FIGURES

FIGS. 3 to 10 show the major components parts of the assembly.

DESCRIPTION OF THE PREFERRED EMBODIMENT

Figure 1:
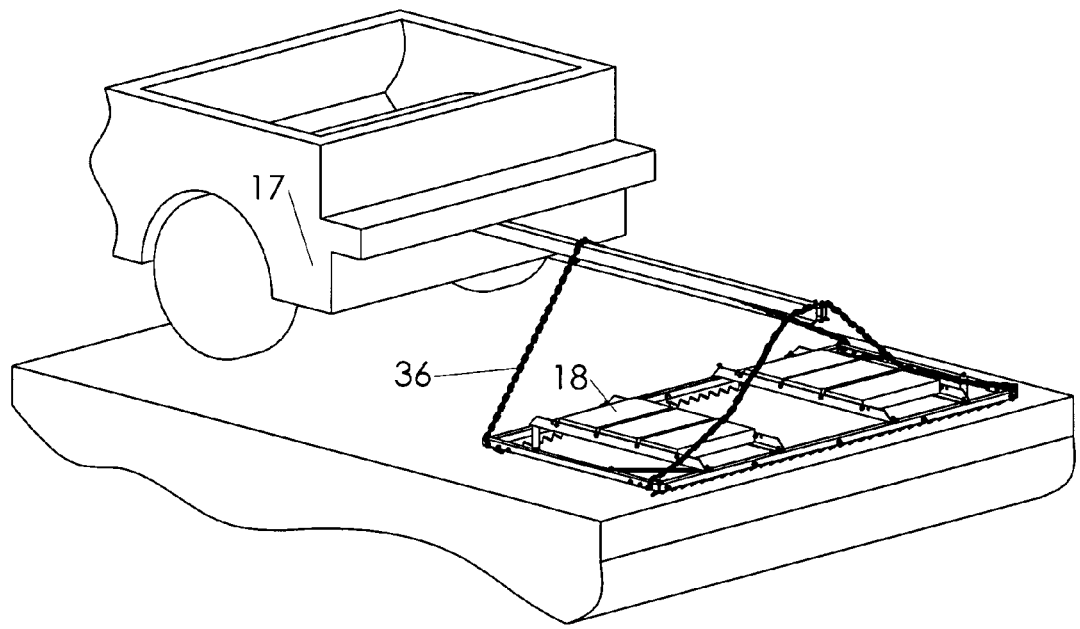
FIG. 1 shows a drawing representation of the invention in use.
Figure 2:
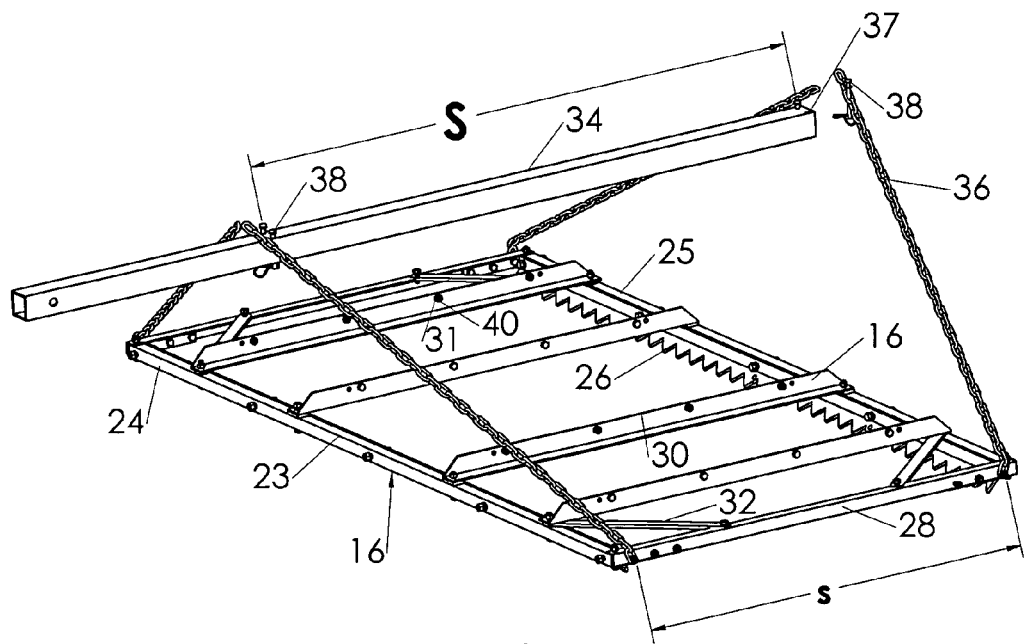
FIG. 2 shows the perspective view of the assembly.

A preferred embodiment of the present invention is illustrated in FIG. 1 (view in use) and FIG. 2 (complete assembly).

FIG. 1 shows the complete assembly connected to a tow vehicle 17. Standard cement blocks 18 are added to the assembly for weight. The cutaway view of the vehicle 17 is shown moving forward thus tensioning the forward chain lengths 36 while the rearward chain lengths 36 are slackened. The chain lengths 36 are of continuous length as depicted in FIG. 1. In practice, it may be preferred by the operator to separate the chain lengths as depicted in FIG. 2. The blades 26 are shown with the teeth down and inward. In the forward direction, the rear blade performs the majority of the cutting force to the surface. When the vehicle moves in reverse, the rearward chain lengths 36 will tension and the forward blade 26 performs the majority of the cutting force to the surface. The ability to move a drag grader bi-directionally allows the operator the ease of not having to turn around in narrow areas and thus allows working areas that require more grading than others to be worked more easily.

FIG. 2 shows the details of the substantially rectangular rigid frame 16, the blades 26, chain lengths 36, means for adjusting chain lengths, and the rigid overhead support 34, the combination of which comprise the complete assembly. Further details of the individual parts are shown in FIGS. 3 to 10.

The inventor will now describe the details of the frame assembly and the blades. A pair of end bar assemblies 24 is secured by conventional fasteners to a pair of end stringers 28 through aligned holes, resulting in a rectangular frame with a leading edge member 23, and a trailing edge member 25. Corner braces 32 are secured by fasteners near each end of each end bar assembly 24 and near each end of each end stringer 28 at approximately equal distance from each corner of the frame. Weight support stringers 30 are secured by fasteners through the end bar assemblies, spaced at a distance corresponding to the desired size of the weights to be applied, the preferred distance being approximately 16 inches to accept standard cement blocks 18 as depicted in FIG. 1. Weight stops 40, consisting of conventional fasteners, are installed in the holes 31 provided in the weight support stringers 30, spaced at a distance corresponding to the desired size of the weights to be applied, the preferred distance being approximately 8 inches to accept standard cement blocks 18 as depicted in FIG. 1. The means of positioning weights is an integral part of the frame strength which keeps manufacturing costs down and makes it easy to increase or decrease the force applied to the surface to one or both blades. The above components comprise the substantially rectangular rigid frame 16. One blade 26 each is fastened to each of the inward wall of the leading edge member 23 and the inward wall of the trailing edge member 25.

Lengths of chain 36 are secured by fasteners near the four corners of the frame 16 through aligned holes in the end bar assembly 24 and end stringers 28, the distance of separation of the chain connections at each end of the end stringers 28 defining distance s. Chain lengths 36 are connected to the rigid overhead support 34 by passing the chain pins 38, consisting of conventional clevis type pins or similar hardware, through a selected link of chain and into the corresponding holes 37 provided in the overhead support 34; placing the pin in a selected link of chain and inserting in the hole 37 provides the means for adjusting the chain length. The means for adjusting chain length using 4 separate pins allows for easy adjustment of chain length which allows the grader to be angled to drive material along the length of the blade in a desired direction, adjusted for vehicle height and grade, and one or both cutting edges can be lifted from the surface. In addition, this overhead support and chain coupling provides superior ability to lift free of any submerged object it encounters during operation, protecting the vehicle and the grader itself. The distance of separation of the chain lengths 36 in holes 37, along the length of the support 34, define the support separation distance S, where S>s. A preferred ratio of S/s is within an approximate range of 1.3 to 1.5. The chain separation distance ratio of 1.3 to 1.5 assures that the chain length in tension during operation stays in tension during operation over dips and bumps in the surface.

FIGS. 3–10 show the individual major metal components. In FIGS. 3 to 5, an end bracket 22, is affixed to each end of the end bar 20, to create the end bar assembly 24, the end bar assemblies 24 becoming the leading edge 23 and trailing edge 25 in the frame assembly 16. FIG. 6 shows a view of blade 26 having a substantially planer first section terminated in a serrated edge 27, and a substantially planer second section 29 inclined with respect to the first section. Each planer face having a series of mounting holes to allow multiple configurations when attached to the trailing or leading edge. In practice, it has been found that the angle of the slope works best at an angle between 30 and 60 degrees. FIG. 7 shows a view of the end runner 28, having an angular form and holes for assembly. FIG. 8 shows a view of the weight support runner 30, having an angular form, and holes for assembly to the leading edge 23 and the trailing edge 25 close to the ends on one plane, and a series of holes 31 on the other plane to hold the stops 40. FIG. 9 shows corner brace 32 with holes near each end for assembly. FIG. 10 shows the rigid overhead support 34 with holes 37 for the chain pin 38 and an additional hole 39 for use as a locking mechanism on a conventional standard vehicle sleeve hitch (not shown).

Figure 11:
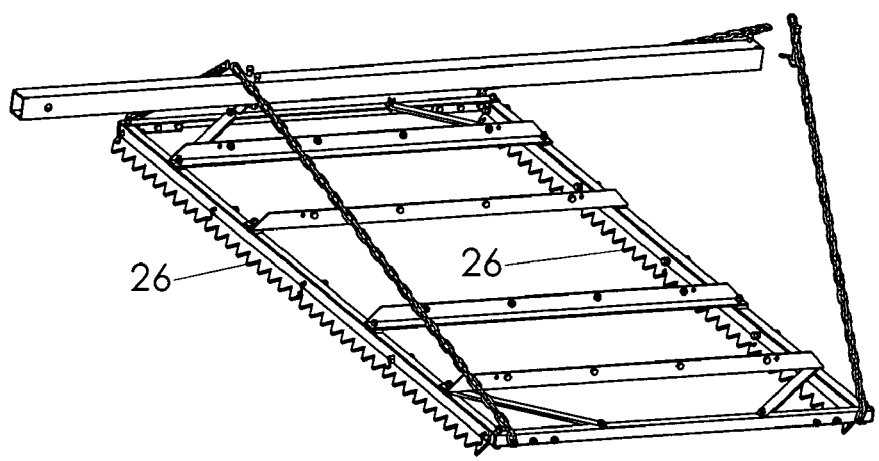
FIGS. 11 to 13 show additional blade configurations on the frame.
Figure 12:
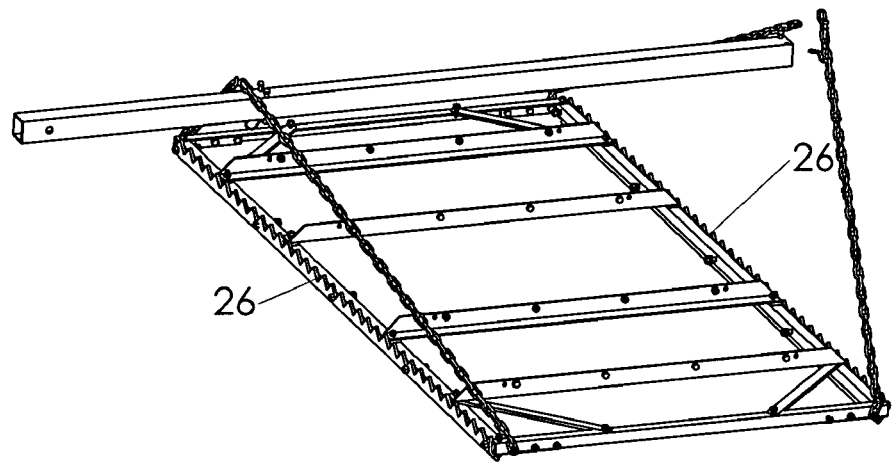
Figure 13:
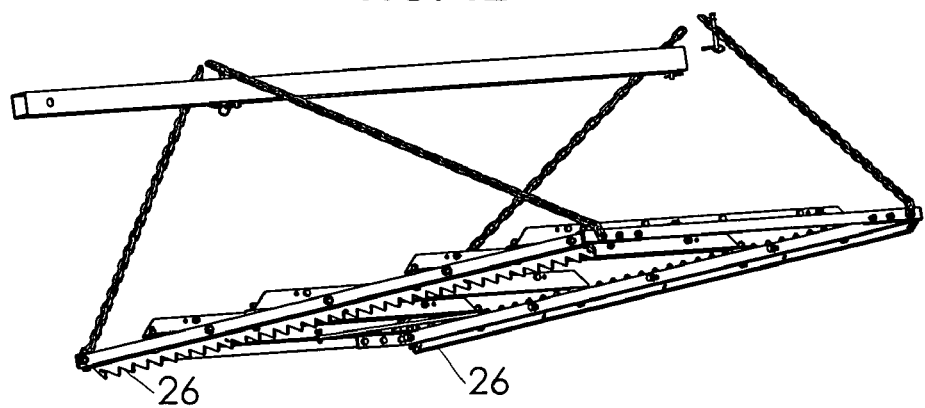

FIGS. 11, 12 and 13 show different blade mounting configurations to the frame. In FIG. 11, both blades 26 are mounted with the serrations down and facing in the same direction. In FIG. 12, both blades 26 are mounted with the serrations up, flat side down, and facing opposing to each other. In FIG. 13, the rearward blade 26 is mounted with the serrations up, flat side down, angle inward and the forward blade 26 is mounted with the serrations down, flat side up and angle inward. In addition to the bi-directionality of the invention, having the blades be configurable has the advantage of making it very versatile on differing surfaces and requirements for moving material in one direction. For example, the blade configuration shown in FIG. 11, with the blades 26 serrated side down and forward, would be used when it is desirable to scarify the surface and move material in the forward direction. In this configuration, both blades scarify the surface with substantially the same force. Since, in reverse, the sloping edge of the blade will be in contact with the surface, very little surface cutting would obviously occur. In conditions such as small loose aggregate or sandy soils, where minimum scarification of the surface is desired, FIG. 12 shows a configuration, in a bi-directional cutting mode, with both flat edges of the blades 26 down and facing each other. FIG. 13 shows the blades configured with the forward blade 26 serrations down and inward and the rear blade 26 flat side down and inward. This configuration is typically used when scarification of the surface in the reverse direction and smoothing the surface in the forward direction are desired such as a large flat area with many potholes.

Accordingly, the reader will see that the bi-directional drag grader can be used to effectively grade earth surface in both directions using a common passenger vehicle or adapting to other equipment. The ability to effectively grade the surface is both directions allows the working of sections to be graded far more efficiently than other drag graders in the prior art. The ability to easily change the amount and position of weight, blade configuration, and chain length to the overhead supports has many advantages to effectively adjust and configure the unit for the surface conditions present.

Although the description above contains much specificity, these should not be construed as limiting the scope of the invention but merely providing illustrations of some of the presently preferred embodiments of the invention. For example, the grader can have different hardware used to adjust chain length and weight stops, different weighting methods could be used, some parts held by fasteners could be permanently joined, the overhead support could other than straight, wheels could be utilized to support the overhead support, retractable wheels could be added to the frame assembly for transport etc.

Thus the scope of the invention should be determined by the appended claims and their legal equivalents, rather than by the examples given.

I claim:

1. A grader designed to be transported by a self propelled machine; the grader comprising:
   a rigid overhead support attachable to the self-propelled machine so as to extend therefrom substantially horizontal to the earth surface to be graded and to extend substantially parallel to the direction of travel;
   a substantially rectangular rigid frame having a leading edge and a trailing edge and end stringers attaching between said leading edge and said trailing edge;
   a pair of blades, one fastening to each of said leading edge and said trailing edge of said substantially rectangular rigid frame;
   a rearward pair of chain lengths, each attached to said substantially rectangular rigid frame and adjacent to said trailing edge and one of said end stringers and attached to said rigid overhead support;
   a forward pair of chain lengths, each attached to said substantially rectangular rigid frame and adjacent to said leading edge and one of said end stringers and attached to said rigid overhead support;
      said forward pair of chain lengths and said rearward pair of chain lengths attaching to said substantially rectangular rigid frame at a separation distance s,
      said forward pair of chain lengths and said rearward pair of chain lengths attaching to said rigid overhead support at a support member separation S,
      wherein S>s.

2. The grader of claim 1 wherein the grader is designed to accept weights, further wherein said substantially rectangular rigid frame further comprises;
   weight support stringers each attached to said leading edge and to said trailing edge.

3. The grader of claim 2 further comprising;
   stops affixed to said weight support stringers corresponding to the size of the weights so as to accept the weights therebetween.

4. The grader of claim 3 wherein said substantially rectangular rigid frame is collapsible and further comprises:
   a leading edge member that defines said leading edge, said leading edge member having an end bracket affixed at each end thereof;
   a trailing edge member that defines said trailing edge, said trailing edge member having an end bracket affixed at each end thereof;
      each of said end stringers attaching by fasteners at one end to one of said end brackets affixed to said leading edge and at the other end to one of said end brackets affixed to said trailing edge;
   said weight support stringers, each attaching by fasteners at one end to said leading edge member and at the other end to said trailing edge member; and
   corner braces each attaching by fasteners at one end to one of said leading edge member and said trailing edge member and at the other end to one of said end stringers.

5. The grader of claim 4 wherein said blades each further comprises:
   a substantially planer first section terminating in a serrated edge and a substantially planer second section inclined with respect to said first section.

6. The grader of claim 5 wherein each of said first section and said second section can be selectively attached to one side of said leading edge or said trailing edge.

7. The grader of claim 6 further comprising;
   means for adjusting the lengths of said chain lengths.

* * * * *